United States Patent [19]

Schwartz

[11] 4,346,992

[45] Aug. 31, 1982

[54] LASER DETECTOR AND SPECTRAL ANALYZER

[75] Inventor: Jacob Schwartz, Arlington, Mass.

[73] Assignee: Sanders Associates, Inc., Nashua, N.H.

[21] Appl. No.: 332,827

[22] Filed: Feb. 15, 1973

Related U.S. Application Data

[63] Continuation-in-part of Ser. No. 797,596, Feb. 7, 1969, abandoned.

[51] Int. Cl.$^3$ .................. G01N 21/00; G01J 1/42; G01J 3/48
[52] U.S. Cl. ........................... 356/73; 356/227; 356/419
[58] Field of Search ............... 356/77, 98, 195, 310, 356/303, 326, 73, 419, 223, 227; 250/237 R

[56] References Cited

U.S. PATENT DOCUMENTS

| | | | |
|---|---|---|---|
| 2,489,297 | 11/1949 | Labin et al. | 328/108 |
| 3,100,264 | 8/1963 | Jaffe et al. | 356/98 |
| 3,493,769 | 2/1970 | Revesz et al. | 250/214 |
| 3,627,421 | 12/1971 | Harley et al. | 356/98 |

*Primary Examiner*—S. C. Buczinski
*Attorney, Agent, or Firm*—Louis Etlinger; Richard I. Seligman

[57] ABSTRACT

There is herein disclosed a laser detector and spectral analyzer comprising a plurality of photoelectric detector elements, at least, two of which are suitably masked and disposed behind a wedge type interference filter. An additional detector element is operated without any mask or filter. The detector output signals are electronically processed to provide a substantially instantaneous and independent indication of the mean spectral wavelength, spectral width, total power and pulse length of radiant energy incident upon the apparatus.

11 Claims, 3 Drawing Figures

LASER DETECTOR AND SPECTRAL ANALYZER

This application is a continuation-in-part of my copending application entitled "Laser Detector and Spectral Analyzer", Ser. No. 797,596, filed Feb. 7, 1969, now abandoned.

BACKGROUND OF THE INVENTION

1. Field of the Invention

The present invention relates generally to the field of electro-optics and more particularly to apparatus for the detection and spectographic analysis of laser energy.

2. Description of the Prior Art

The prior art in the field to which the present invention relates may be separated into two basic categories; spectral research instruments and field apparatus.

With the increasing significance of spectral research a wide variety of spectrographic instruments have been produced, which generally involve the use of either prisms or diffraction gratings to disperse the incoming radiation. Prisms, however, have very poor linearity of wavelength scale which is uncontrollable and which results in a limitation upon the dynamic range of the instrument. The use of diffraction gratings, on the other hand, introduces an ambiguity due to the overlap of orders of interference which also serves to limit the usable dynamic range of the instrument. Particularly in the field of infrared spectroscopy the detector elements which may be used with the conventional spectrograph are limited due to the low energy which is generally available in the dispersed radiation beam. If maximum sensitivity is needed, spectroscopic apparatus must have high energy throughout for efficiency.

It will be appreciated that there are many instances where it is desirable in a field rather than a laboratory environment to detect laser radiation and to differentiate it from other light sources. Since the conventional spectrograph is typically a delicate, bulky and expensive instrument, its use in a field environment is at least infeasible if not impossible. The alternative apparatus for laser detection in the field has in the past involved the use of a multiplicity of detector elements, each having a narrow bandpass filter corresponding to the wavelengths of lasers with which an encounter may be anticipated. The shortcomings of this approach lie basically in its incapacity to provide for unanticipated wavelengths and its susceptability to false alarms due to naturally occurring phenomena such as solar radiation. Further the use of multiple filtered detectors requires an output lead pair for each detector. If a large spectral range is to be covered the generation of a yes/no indication as to whether the detected radiation is from a laser can thus require apparatus of considerable complexity.

OBJECTS AND SUMMARY OF THE INVENTION

It is therefore a primary object of the present invention to provide a new and novel apparatus for the detection and spectral analysis of laser radiation.

It is another object of the present invention to provide apparatus of the above-described character having wide dynamic range.

It is a further object of the present invention to provide apparatus of the above-described character which provides a substantially instantaneous and independent indication of the wavelength, bandwidth and power of radiant energy incident thereon.

It is yet another object of the present invention to provide apparatus of the above-described character which is operable with analog signal processing apparatus.

The foregoing as well as other objectives of the present invention are accomplished through the use of a wedge type interference filter in combination with a plurality of photoelectric detector elements and suitable electronic signal processing apparatus. The wedge filter essentially distributes the energy which is impingent thereupon along its length as a function of wavelength. Any given wavelength will be transmitted by one and only one transverse strip along the filter. Disposed behind the filter are a first detector which is fully exposed to all radiation passing through the filter, a second detector covered by a mask having an aperture which increases linearly with position and thus wavelength and a third detector covered by a mask having an aperture which increases quadratically with wavelength. The detector output signals thus provide the basis for electronically determining the wavelength, bandwidth and power of impingent radiant energy.

The objectives stated hereinabove together with other objects, features and advantages of the present invention will become more apparent from the following detailed description taken in conjunction with the appended drawings.

DESCRIPTION OF PREFERRED EMBODIMENT

Figure 1:
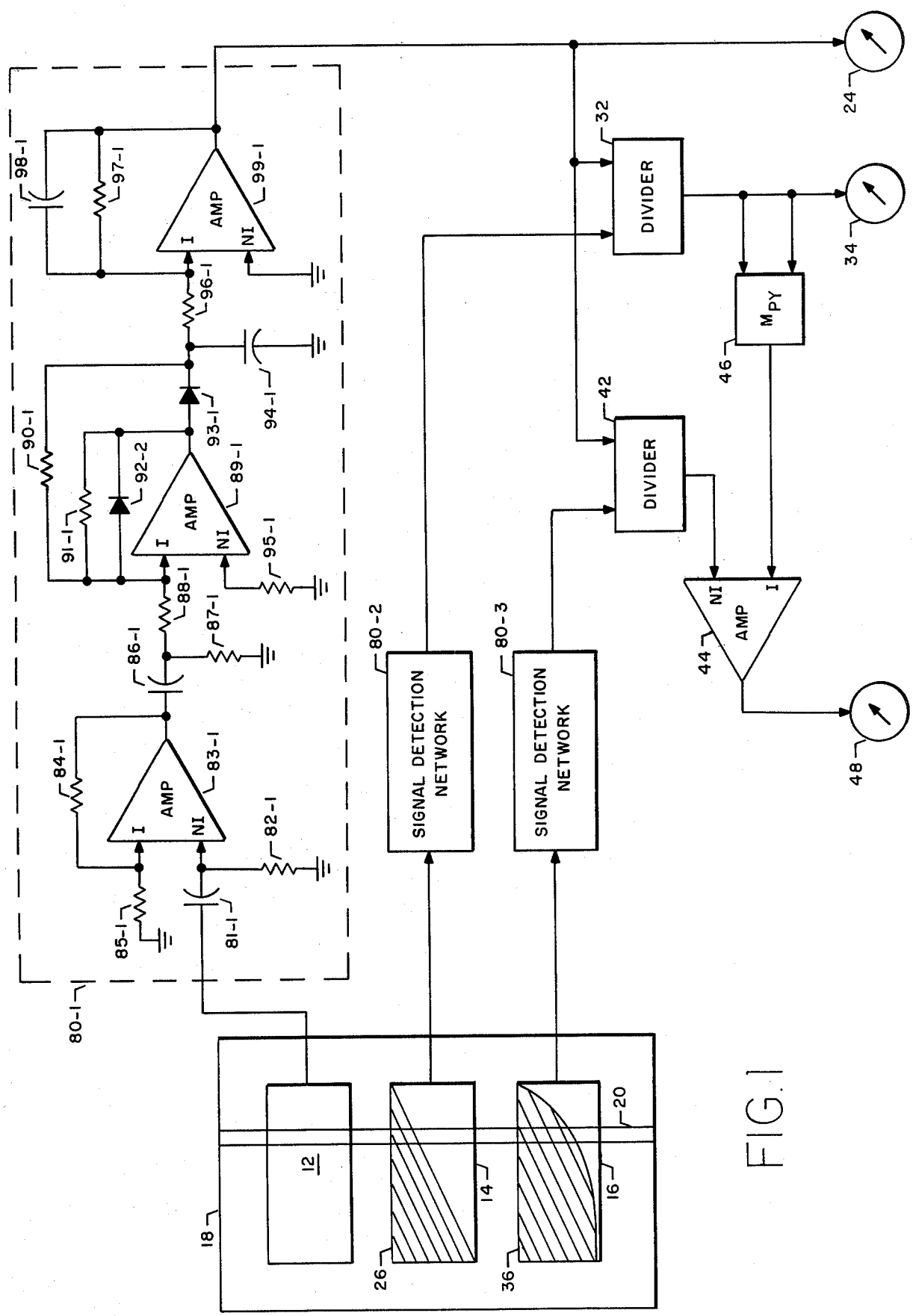
FIG. 1 is a schematic diagram of one embodiment of the present invention.

Turning now to FIG. 1 there is illustrated a schematic diagram of a laser detector and spectral analyzer constructed according to the principles of the present invention.

Laser detector apparatus embodying the present invention includes at least three substantially identical photoelectric detectors 12, 14 and 16 disposed behind a wedge filter 18. The photoelectric detectors 12, 14 and 16 may take the form of any suitable detector which responds to laser energy, preferably a silicon device, such as type SGD-100 manufactured by E.G.&G. Corporation. The wedge filter 18 is an interference filter having a systematic positional variation in the thickness of deposited interference layers such that there is a systematic known variation in the center of the local passband with position along the left-right axis of the filter. Filters of this type are known in the art and may be typified by the Schott S-60 linear wedge filter which is available from the Jena (Schott) Glass Company. Thus, light will pass through the wedge filter in narrow strips, such as strip 20, corresponding to each band of wavelengths contained in the incident light and fall upon the detectors 12, 14 and 16. When illuminated by monochromatic light the filter 18 passes that light in a single strip 20 which is centered at a known position along the length of the filter corresponding to the wavelength of the light. In the illustrated embodiment the laser source is assumed to be a pulsed source with a pulse repetition rate on the order of 20 pulses per second or more, located on the side of filter 18 which is opposite to the detectors 12, 14 and 16. The width of the transmitted strip 20 may be preselected from any value between approximately 5 angstroms to hundred of angstroms depending upon the desired wavelength resolution.

The detectors 12, 14 and 16 are masked to receive differently weighted portions of the filtered radiation. The detector 12 has all of its surface exposed to the filtered radiation (i.e., it has no aperture mask) so as to provide an electrical output signal, the amplitude of which is proportional to the power contained in the incident radiation.

The second detector 14 has a portion of its surface covered by an aperture mask 26 having a geometrical shape such as the one illustrated, whereby the area of detector 14 illuminated by the strip 20 is a linear function of the center wavelength of light passing through the wedge filter 18 and the power in the illuminating light. Accordingly, the detector 14 produces an electrical output signal having an amplitude which is proportional to the product of the center wavelength and of the power of the incident radiation. Hence, when placed in a proper form, the output signal of detector 14 can be divided by the output signal of detector 12 to produce a signal proportional to the center wavelength of the incident radiation.

The third photoelectric detector 16 has a portion of its surface covered by another aperture mask 36 such that the detector area illuminated by the strip 20 is a quadratic (parabolic) function of the wavelength of the illuminating light. Thus, the amplitude of the output signal of detector 16 is also a quadratic function of the filtered radiation wavelength. When placed in proper form, the output signal of detector 16 can be subtracted from the square of the center wavelength signal to produce an electrical signal which is proportional to the square of the bandwidth of the illuminating light.

Since the output signals of the detectors 12, 14 and 16 are very low level pulses, they need to be placed in a proper signal form to drive such circuits as signal dividers and indicating instruments. To this end, the output signals of the detectors 12, 14 and 16 are coupled to signal detection networks 80-1, 80-2, and 80-3, respectively. Each of these signal detection networks is operative to filter out background noise (due to ambient light), to amplify the associated pulse signal and to convert the peak or maximum amplitude of the pulse signal to a d.c. level. Since these signal detection networks are identical to one another, only the network 80-1 is illustrated in detail in FIG. 1.

The network 80-1 includes a series capacitor 81-1 and a shunt resistor 82-1 which are arranged to a.c. couple the output signal of detector 12 to the non-inverting (NI) input of an operational amplifier 83-1. The capacitor 81-1 and resistor 82-1 additionally serve as a high pass filter so as to block d.c. components in the output signal of detector 12 which are due to ambient light conditions.

Assuming the use of the aforementioned SGD-100 type photodetector element connected and biased in the manner suggested by the manufacturer, the output signal of detector 12 consists of a negative going pulse for each burst or pulse of incident laser radiation. The operational amplifier 83-1 is connected as a noninverting amplifier so that the signal at its output also consists of corresponding negative going pulses. To this end, a feedback resistor 84-1 is connected between the output and inverting (I) input of amplifier 83-1. A shunt resistor 85-1 is connected between the I input and a point of reference potential, such as circuit ground illustrated by the conventional symbol therefor.

The negative going output pulses from amplifier 83-1 are applied via an a.c. coupling network and a series input resistor 88-1 to the I input of another operational amplifier 89-1. The a.c. coupling network includes a series capacitor 86-1 and a shunt resistor 87-1. The operational amplifier 89-1 has its output coupled to a peak detector circuit which includes a series diode 93-1 and a shunt capacitor 94-1. The amplifier 89-1 is connected as an inverting type amplifier so as to convert the negative going pulses at its input to positive going pulses at its output. To this end, a feedback resistor 94-1 is coupled between the cathode of diode 93-1 and the I input of amplifier 89-1. The NI input is connected to circuit ground by way of a resistor 95-1. In order to suppress any spurious positive going pulses at the I input of amplifier 89-1 an additional feedback network consisting of the parallel combination of a resistor 91-1 and a diode 92-2 are connected between the output and I input of the amplifier. It should be noted that the resistor 91-1 is made significantly larger than the resistor 90-1 (e.g., by a factor of 10) so that the gain of amplifier 89-1 is primarily determined by the value of resistor 90-1.

The series diode 93-1 and shunt capacitor 94-1 together with the input impedance of another operational amplifier 99-1 essentially operate as a conventional diode peak detector. However, due to the large input impedance of the operational amplifier 99-1, the peak detector has a relatively long time constant so that the peak detector additionally holds or stores the peak value of the positive going pulse at the output of amplifier 89-1. For an exemplary design, this time constant is on the order of 100 milliseconds which proved suitable for laser pulse repetition rates on the order of 20 pulses per second or more. This results in a stretched or wider pulse at the output of amplifier 99-1. As the repetition rate decreases, the time constant becomes longer.

The d.c. voltage value at the output of the peak and hold detector is coupled via a series input resistor 96-1 to the I input of operational amplifier 99-1. This operational amplifier is connected as an inverting low pass filter type amplifier so as to filter out remaining high frequency components of the short input pulse to the divide detector. To this end, a feedback circuit including a parallel connection of resistor 97-1 and capacitor 98-1 is connected between the output and I input of amplifier 99-1. The output of amplifier 99-1 then is a sequence of stretched pulses which are more negative than the pulses at the output of the peak and hold circuit.

The operational amplifiers 83-1, 89-1 and 99-1 may take on any suitable form as dictated by the choice of the designer. By way of example, each of these amplifiers may be a model 709 type manufactured by the Fairchild Semiconductor Corp. In the interest of clarity, the power terminal and frequency compensation connections for each of these amplifiers has been omitted from the drawing. All of these connections are made in the manner recommended by the manufacturer.

The stretched output pulses of the network 80-1, being proportional to the peak power incident upon the wedge filter 18 are applied directly to a power indicator 24 so as to give a direct reading of the peak power. The power indicator 24, as well as each of the indicators 34 and 48, may suitably take the form of a 0 to 1 milliampere D'Arsonval type meter.

The output pulses from network 80-2 while being proportional to the product of center wavelength and incident power are divided by the output signal of network 80-1 by means of a divider network 32. The output signal from the divider 32 is thus directly representative of the center wavelength of the incident light and is applied to the meter 34.

The output pulses from the network 80-3 are divided by the output signal of network 80-1 by means of a second divider network 42 so as to eliminate the peak power factor. The output signal of divider 42 is then subtracted from the square of the center wavelength signal output 32. To this end, the output of divider 32 is applied to both the multiplier and multiplicand inputs of a multiplier 46 so that its output signal is the square of the center wavelength signal. This output signal multiplier 46 is then applied to the I input of a difference amplifier 44. The NI input of the difference amplifier 44 is connected to receive the output of the divider 42. The output of the difference amplifier 44 then is proportional to the square of the bandwidth of the incident laser radiation pulse and is applied to a meter 48.

The difference amplifier 44 may also take the form of the aforementioned model 709 type operational amplifier connected in the manner shown at page 57 of the Handbook of Operational Amplifier Applications, a publication of Burr-Brown Research Corporation. The divider networks 32 and 42 and the multiplier network 46 may suitably take the form of the multiplier/divider unit, model 4029/25 manufactured by Burr-Brown Research Corp.

Since the sensitivity of most detector elements varies with the wavelength of the incident energy an error could be introduced into the detector output signals. The present invention may readily provide for correction of this error by corresponding adjustment of the aperture masks 26 and 36.

A fourth detector element (not shown) may also be provided which is not covered by any filter or mask and which is optimized for response speed. The output signal from such a detector is thus an approximation of the waveshape of the illuminating light. Generally the receipt of a pulse of light having a duration of between one and ten microseconds may be taken as a strong indication that the illuminating light is emanating from a Q-switched laser since no known background noise source and few if any non-laser sources could yield so short a pulse. Accordingly, the output signal from such a detector could be employed to provide an indication whether or not a laser was in fact illuminating the apparatus.

The output signal from detector 12 may in addition to providing a direct indication of incident power be utilized to activate an audio or visual alarm (not shown) when the power being received is in excess of a predetermined threshold level.

It will thus be seen that the Applicant has invented a laser detector and spectral analyzer, which although simple and reliable, has the capacity to determine the wavelength, bandwidth, power and approximate pulse duration of light received from a remote laser source as well as to discriminate lasers from non-laser sources. It should be apparent that the laser detector and spectral analyzer can also be designed to detect and analyze laser pulses with extremely low repetition rates by lengthening the time constant of the peak or sample and hold circuit. The apparatus of the invention as shown in its preferred embodiment requires no imaging optical elements and thus provides a full hemispherical field of view if desired and completely avoids the introduction of chromatic aberration problems which are involved with the use of imaging optics between the dispersing element and detector.

Figure 2:
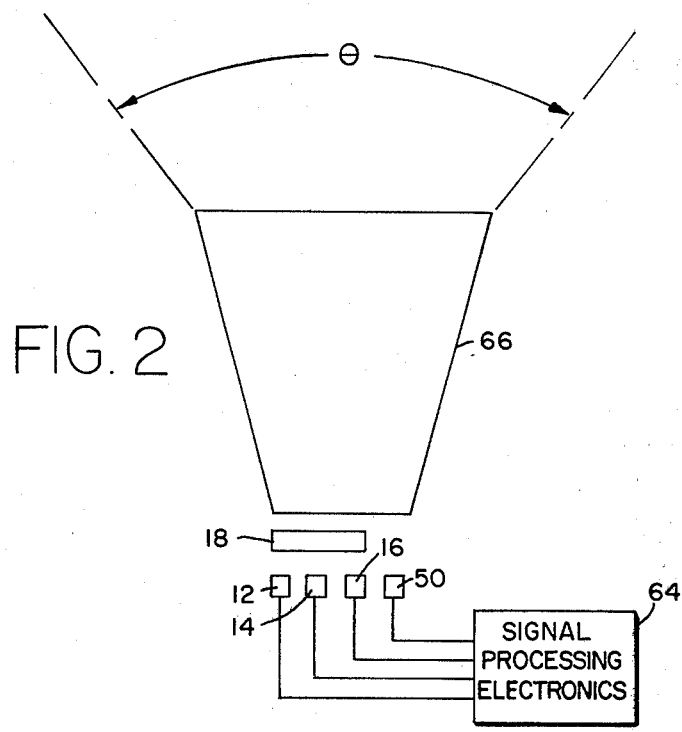
FIG. 2 is a cross-section view of an alternative embodiment of the detector elements of the present invention including collecting optics.

Particularly in a field environment it is foreseeable that it would be required to detect a laser from outside the direct beam by such means as aerosol scattering or radiation which is diffusely reflected from a target. Apparatus according to the principles of the present invention and having the additional sensitivity required to detect and analyze such low intensity light is illustrated in cross-section in FIG. 2. In this embodiment three photoelectric detector elements 12, 14 and 16 are disposed behind a wedge filter 18 in the manner described with reference to FIG. 1 and an unfiltered detector 50 is disposed adjacent thereto. The detector output signals are applied to signal processing electronics 64 as shown in detail in FIG. 1 and illustrated in FIG. 2 as a single element for the purposes of brevity and clarity. A condensing cone or cone channel optical element 66 is disposed on the light incident side of the filter 18 with its narrower end adjacent the filter. In this manner the sensitivity of the apparatus is improved without resort to imaging optics and their attendant problems due to chromatic aberration. The degree of improvement provided by the condensing cone 66 is determined by the field-of-view $\theta$ of the cone and by the ratio of the detector to collector apertures of the cone.

Figure 3:
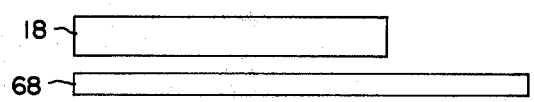
FIG. 3 is a cross-section view of a second alternative embodiment of the detector elements of the present invention wherein small detectors and focusing means are provided.
Figure 3:
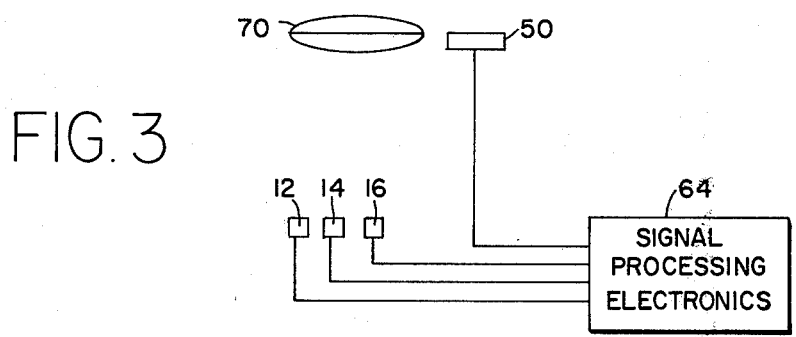

FIG. 3 illustrates a cross section view through the transverse dimension of the wedge filter of an alternative embodiment of the present invention wherein detectors which are smaller than available filters must be used and some measure of chromatic aberration may be acceptable. In this embodiment the wedge filter 18 is disposed adjacent a diffusing screen 68 such as ground glass whereby the strip of light passing through the filter is imaged thereon. A lens 70 is disposed such as to image the diffusing screen on the detectors 12, 14 and 16. It will be noted that it is not required that the diffusing screen be imaged on detector 50. Thus detector 50 may conveniently be disposed adjacent lens 70. The detector outputs are applied to suitable signal processing electronics 64 as discussed hereinabove.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

Having described what is new and novel and desired to secure by Letters Patent, what is claimed is:

1. Apparatus for the detection and spectral analysis of radiant light energy comprising:
   a wedge filter having a predetermined variation in optical passband which is dependent upon the position thereon;
   photoelectric detection means disposed behind said filter and responsive to energy transmitted thereby to produce a first output signal which increases linearly with the position at which energy is transmitted by said filter and a second output signal which increases quadratically with said position; and signal processing means coupled to said detection means for combining said output signals such as to provide outputs representative of selected spectral properties of said energy.

2. Apparatus as recited in claim 1 wherein:

said wedge filter passband varies with position along a longitudinal axis thereof; and said detection means comprises a first photoelectric detector element having an aperture mask on the radiation incident side thereof which increases linearly with longitudinal position, and a second photoelectric detector element having an aperture mask on the rediation incident side thereof which increases quadratically with longitudinal position.

3. Apparatus as recited in claim 2 further including:

a third photoelectric detector element disposed such as to be fully exposed to radiation transmitted by said filter and producing a third output signal representative of the amount of energy incident thereon.

4. Apparatus as recited in claim 3 further including:

means coupled to said third detector for including the power of radiation incident thereon.

5. Apparatus as recited in claim 4 wherein:

said third output signal is applied to said power indicating means through a peak and hold circuit.

6. Apparatus as recited in claim 3 wherein said signal processing means includes:

first divider means for dividing said first output signal by said third output signal to thereby provide a signal representative of the longitudinal position at which said energy is transmitted by said filter and thus representative of the wavelength of said energy.

7. Apparatus as recited in claim 3 further including:

means coupled to said first dividing means for indicating the wavelength of said energy.

8. Apparatus as recited in claim 6 wherein said signal processing means further includes:

second divider means for dividing said second output signal by said third output signal, means for squaring the output signal from said first divider, and means coupled to said second divider means and said squaring means for subtracting said squaring means output signal from said second divider output signal to produce a signal representative of the square of the bandwidth of said energy.

9. Apparatus as recited in claim 8 further including:

means coupled to said subtracting means for indicating the square of the bandwidth of said energy.

10. Apparatus as recited in claim 1 further including:

a cone channel optical element disposed on the light incident side of said filter whereby the field-of-view of said apparatus is limited to a preselected value.

11. Apparatus as recited in claim 1 further including:

a diffusing screen disposed adjacent said filter and receiving an image of said energy transmitted by said filter, and means for imaging said diffusing screen upon said photoelectric detection means.

* * * * *